US008442673B2

(12) United States Patent
Langosch et al.

(10) Patent No.: US 8,442,673 B2
(45) Date of Patent: May 14, 2013

(54) METHOD FOR CONTROLLING A MACHINE FOR TREATING CONTAINERS

(75) Inventors: Martin Langosch, Regensburg (DE); Joerg Triebel, Alteglofsheim (DE)

(73) Assignee: Krones AG, Neutraubling ( * ) Notice: Subject to any disclaimer, the term of this patent is extended or adjusted under 35 U.S.C. 154(b) by 437 days.

(21) Appl. No.: 12/592,835

(22) Filed: Dec. 3, 2009

(65) Prior Publication Data

US 2010/0152889 A1 Jun. 17, 2010

(30) Foreign Application Priority Data

Dec. 12, 2008 (DE) ......................... 10 2008 062 064

(51) Int. Cl.
*G06F 19/00* (2006.01)
*G06F 7/00* (2006.01)
*G06F 17/00* (2006.01)

(52) U.S. Cl.
USPC ........... 700/230; 700/109; 700/110; 700/243; 700/244; 198/571; 198/470.1; 198/469.1; 198/474.1; 198/605

(58) Field of Classification Search ....................... None
See application file for complete search history.

(56) References Cited

U.S. PATENT DOCUMENTS

| | | | | | |
|---|---|---|---|---|---|
| 2,739,695 | A * | 3/1956 | Haycock | ........................ | 198/430 |
| 5,650,037 | A | 7/1997 | Larson | ........................... | 156/540 |
| 2007/0017593 | A1 * | 1/2007 | Bernhard | ........................... | 141/2 |
| 2008/0223691 | A1 * | 9/2008 | Nishi et al. | ................. | 198/470.1 |
| 2009/0171489 | A1 | 7/2009 | Kramer | ............................ | 700/97 |

FOREIGN PATENT DOCUMENTS

| | | | |
|---|---|---|---|
| DE | 31 37 201 | A1 | 3/1983 |
| DE | 696 29 203 | T2 | 4/2004 |
| DE | 10 2006 025 010 | A1 | 11/2007 |
| DE | 10 2006 028 797 | A1 | 12/2007 |
| EP | 0 717 703 | B1 | 6/1996 |
| EP | 1 174 345 | B1 | 1/2002 |
| EP | 18 64 910 | A1 | 12/2007 |

* cited by examiner

*Primary Examiner* — Gene Crawford
*Assistant Examiner* — Yolanda Jones
(74) *Attorney, Agent, or Firm* — Davidson, Davidson & Kappel, LLC

(57) ABSTRACT

The invention relates method for controlling a machine for treating containers (12) as well as for controlling processing and/or treatment stations located downstream from it, wherein the machine has a plurality of turntables (42) that are each driven by a motor and that serve to orient and/or position the containers (12), in which method the motor drives (44) of the turntables (42) are each monitored separately, so that, if an error occurs with one or more of the turntable drives (44), the affected defective turntable drives (44) are deactivated while the machine and/or the stations located downstream continue to be operated.

19 Claims, 2 Drawing Sheets

METHOD FOR CONTROLLING A MACHINE FOR TREATING CONTAINERS

This claims the benefit of German Patent Application No. 10 2008 062 064.5, filed on Dec. 12, 2008 and hereby incorporated by reference herein The invention relates to a method for controlling a machine for treating containers, especially a rotary stage machine. The invention also relates to such a machine for treating containers.

BACKGROUND

The treatment of containers such as, for example, filling them or applying labels onto containers or bottles filled with beverages normally takes place in a continuous process employing automatic machines. The labeling is done with automatic labeling machines that are usually part of a rotary stage machine used for filling the containers. During operation of such machines, numerous different errors can occur which, under unfavorable circumstances, can cause the filling machine to come to a standstill, depending on the type of error.

Prior-art rotary stage machines are equipped with turning tables on which the containers or bottles stand and can be positioned in a desired angular orientation. These so-called turntables each have their own drive, usually in the form of an electromotive drive, that allows the individual orientation and positioning of the containers.

German patent application DE 31 37 201 A1 discloses a labeling machine for containers that has a rotary stage. Several turntables are mounted on this rotary stage and the intrinsic rotation of these turntables during one revolution of the rotary stage can be controlled in such a way that the containers that they hold and that are to be labeled move under certain movement conditions past labeling elements, brushing elements or the like which are arranged along the circumference of the rotary stage. Each turntable is coupled to its own electric stepping motor that is attached to the rotary stage. Moreover, each stepping motor is associated with a control unit that supplies control pulses to the motor as a function of the movement conditions of the rotary stage.

European patent specification EP 0 717 703 B1 discloses a computer-controlled, carousel-type labeling machine in which each treatment station for the containers is equipped with a motor that is actuated by a computer together with the drive motor for the carousel in order to orient the containers in the desired manner so that the labels can be precisely applied.

European patent specification EP 1 174 345 B1 also discloses a machine that serves to orient containers and that has a rotor that revolves around a vertical machine shaft. Container carriers having servo drives are arranged on the rotor and these servo drives serve to orient the container carrier relative to the rotor by means of an electronic control and regulation unit as a function of control parameters or control data.

Problems can always arise during operation of such a machine if at least one of the electromotive servo drives for a turntable develops a defect and fails, since this causes erroneous labeling and/or other error messages duration operation. In such a case, if the machine is not switched off immediately after the error has been detected, it could happen that many incorrectly labeled containers will be forwarded for further processing and/or packaging as though they were free of defects.

SUMMARY OF THE INVENTION

It is an object of the present invention to provide a method with which the down times caused by errors or defects can be reduced in machines for treating and/or processing containers.

The present invention provides a method for controlling a machine for treating containers as well as for controlling processing and/or treatment stations located downstream from it. The machine has a plurality of turntables that are each driven by a motor and that serve to orient and/or position the containers. The motor drives of the turntables are each monitored separately, so that, if an error occurs with one or more of the turntable drives, the affected defective turntable drives are deactivated without the need to switch off the machine and/or the stations located downstream from it. In particular, the machine can be a rotary stage machine in which several turntable drives are arranged on a rotor, said drives serving to appropriately rotate and position containers or bottles standing on the turntables so that the labels can be applied at the correct position, for instance, by means of labeling machines located downstream. Normally, the turntables are supplied with a shared operating voltage and, in accordance with a currently widespread industry standard, by means of data-bus control lines.

In the case of these conventional machines, the data bus detects a defective status of a drive if said drive experiences a failure or a malfunction. If all of the drives are being operated at the same time, the machine has to be brought to a standstill whenever one or more individual motors fail or malfunction in order for the error to be remedied, for example, by replacing the defective drive. If the drive is still functional but if the labeling result of the affected turntable is unsatisfactory, the machine likewise has to be halted so that the reasons for the unsatisfactory labeling can be determined, since continuing to operate the machine would give rise to a relatively high reject rate due to the number of incorrectly labeled containers. In order to increase the productivity during the mechanical treatment of containers and in order not to absolutely have to interrupt production because of minor problems, the present invention calls for the machine to continue to operate when an error is detected in one or more rotary drives of the turntables. Since the affected turntable drives can be clearly identified, they can be deactivated individually and the subsequent processes can be adapted individually to this situation in that the positions that are associated with the deactivated turntable drives are dealt with in an appropriate manner. This can be done, for instance, by switching off the affected labeling aggregates and/or by diverting the unlabeled containers out of the conveying process and, if applicable, returning the containers at a suitable stage of the treatment or processing.

Each deactivated turntable drive should trigger an at least partial deactivation of the subsequent monitoring steps involving the container positions associated with the deactivated turntable drive of the machine, so that the entire downstream treating and processing operation of the machine can be adapted, resulting merely in a small drop in productivity due to the slightly reduced output of treated containers. In this manner, unplanned interruptions in production can be avoided in most cases, so that the method according to the invention prevents a negative impact on the maintenance and production schedules for the machine.

Switching off the machine, which detrimentally affects productivity, can be avoided by means of the method according to the invention since the partial deactivation of monitoring steps entails the deactivation of an automatic shutdown of the machine that would have resulted from the at least one defective turntable drive. Moreover, each deactivated turntable drive triggers an at least partial deactivation of the subsequent processing and/or treatment steps involving the container positions associated with the deactivated turntable drive of the machine. Thus, for example, when a defective turntable drive has been detected, a labeling device located downstream can be temporarily deactivated at least for the container position associated with that defective turntable drive, as a result of which there is no need to eject containers that were incorrectly labeled because they had not been properly rotated and positioned when the labels were being applied.

As an alternative or in addition, when a defective turntable drive has been detected, it is also possible to temporarily deactivate a downstream filling device, at least for the container position that is associated with the defective turntable drive. Moreover, when a defective turntable drive has been detected, it is possible to temporarily deactivate, for example, a downstream device for sealing the containers, at least for the container position that is associated with the defective turntable drive.

In order for the affected containers to be removed from the production process, each deactivated turntable drive can be coupled to a diverting device that is downstream from the machine or rotary stage machine in order to divert the containers associated with the deactivated turntable drive from the subsequent processing and/or treatment steps of the machine. Advantageously, the diverting device can also be coupled to a conveying device that returns the diverted containers to the rotary stage machine and/or to a conveying device located upstream from the rotary stage machine, so that the unlabeled or otherwise treated containers can be returned directly to the production process, as a result of which the total output of the machine is only reduced by an insignificant, negligible amount.

The special advantage entailed by the use of the method according to the invention can be seen in actual practice where, when a turntable drive has been detected as being defective, the variable operating time remaining until a routine inspection and/or until a maintenance shutdown can be shortened or reduced. In this manner, the defective drive can be shut down during ongoing operation and can be replaced at the time of the next, routine maintenance or during a scheduled product change, in other words, at an uncritical moment. If the possibility exists to variably choose the point in time for the routine maintenance shutdown, it can be advantageous to select the operating time remaining until the maintenance shutdown in a suitable manner, especially to shorten it, so that the system can once again be run at full capacity at an earlier point in time. However, if the remaining operating time cannot be reduced because, for instance, another type of beverage is going to be filled after the system shutdown, then the method according to the invention entails the special advantage that the productivity only drops slightly in comparison to a problem-free operation of all of the turntable drives.

The method according to the invention is particularly well-suited for controlling a rotary stage machine having a circular arrangement of a plurality of turntables that are each driven by a motor and that serve to orient and/or position the containers, as well as for controlling a straight-line machine having a linear arrangement.

Moreover, the present invention relates to a machine for processing and/or treating containers and equipped with a plurality of turntables that are each driven by a motor and that serve to orient and/or position the containers. This machine can be, in particular, a so-called rotary stage machine in which the turntables are arranged along the circumference of a rotor. Each of the motor drives of the turntables is associated with a monitoring device that provides separate function monitoring and that emits an error signal when an error occurs. The machine also comprises a control device for processing the error signals, for deactivating the affected defective turntable drives and for switching off individual functions of the machine while the machine continues to operate. Additional variants and embodiments of such a machine ensue from the above-mentioned variants of the method according to the invention for operating such a machine. The aspects and advantages discussed with reference to the method by way of an example likewise apply to the corresponding machine as well as to all of its variants.

The underlying idea of the present invention is the possibility to selectively put individual drives into operation and to monitor them. If one or more of the drives is deselected, its end stages or so-called output parts are switched off and the control software uncouples the drive from the data bus. As a result, all of the errors messages and operating states associated with the deselected drives are ignored. The settings in the drive configuration and the monitoring functions are set in such a way that the "silence" of the affected drive does not give rise to a warning or to an error. In this case, the deselected drives are no longer started via the data bus and thus they remain without current. The drive itself is configured in such a way that, in the absence of control commands, no current reaches the end stages.

The special advantage of the function according to the invention lies in the fact that, if one of the individual drives develops a malfunction, it is deselected and the production can be promptly resumed or can continue to run without interruption. The system can continue to run at a slightly reduced output. The affected drive can then be replaced at the time of the next routine maintenance, scheduled production modification or product change and thus at a non-critical point in time.

If desired, a suitable visual indication of one or more switched-off turntable drives can be provided, for instance, by means of a monitor output in a central control station. In this manner, people familiar with the controls of the system can already determine in advance of a maintenance shutdown of the machine that individual turntable drives are defective and will need to be repaired or replaced. Optionally, the visual indication can already be coupled to a an analysis of the detected error in order to ascertain and report, for example, the type of defect, so that the maintenance and repair can take place earlier.

BRIEF DESCRIPTION OF THE DRAWINGS

Additional features, goals and advantages of the present invention ensue from the following detailed description of a preferred embodiment of the invention, which shall not be construed as a restricting example and to which the accompanying drawings make reference. In this context, identical parts fundamentally have the same reference numerals and are not explained multiple times.

DETAILED DESCRIPTION

Figure 1:
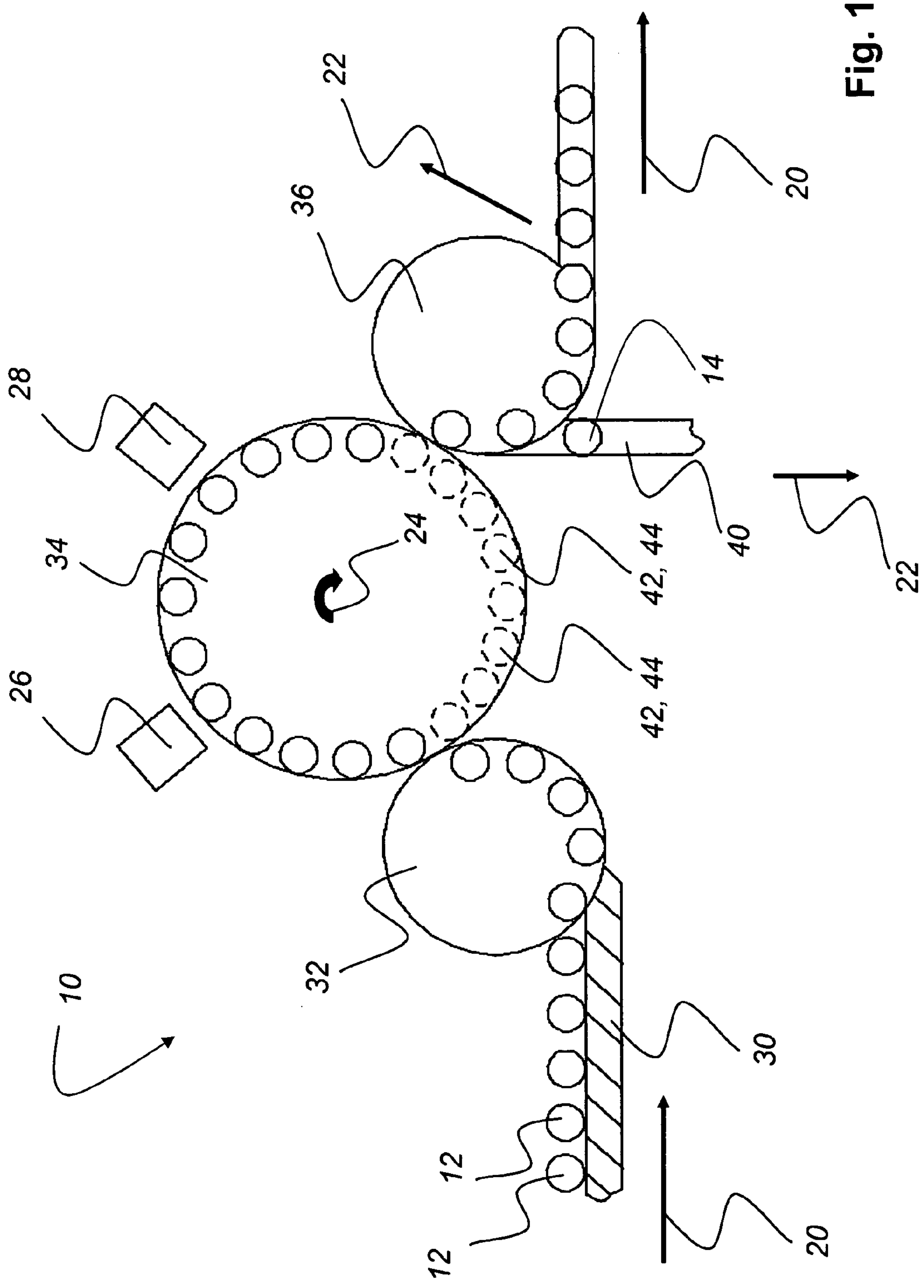
FIG. 1—shows a schematic set-up of an embodiment of a rotary stage machine for processing and labeling containers.

The schematic depiction in FIG. 1 shows a typical set-up of a rotary stage machine 10 having a feed star 32 and a discharge star 36 as well as a rotating container stage or rotor 34. A rotating single-part screw 30 places a continuous stream of incoming containers 12 with the requisite spacing on a conveyor belt in the conveying direction 20 in order to ensure a problem-free transfer to a container-sized recess of the feed star 32.

The feed star 32 transfers the containers 12 to the centering tables or turntables 42 installed in a circle on the edge of the container stage 34. The container stage 34 is made to rotate clockwise 24. The containers 12 standing on the turntables 42 are moved past at least one labeling aggregate 26 and labeled. In this process, the containers 12 are rotated relative to the stationary labeling aggregate 26. For this purpose, each turntable 42 has an electromotive turntable drive 44. All of these turntable drives 44 can be actuated individually so that each container 12 can be rotated and oriented in order to be labeled and/or to undergo other treatment steps. A brushing aggregate 28 that serves to press the previously applied labels onto the outer surface of the containers 12 is indicated on the container stage 34.

Preferably, the turntable drives 44 are individually actuated by means of a data bus control unit 46 (see FIGS. 2 and 3) which, when a defective turntable drive 44 is detected, interrupts the activation of the labeling aggregate 22 as well as, if applicable, of the brushing aggregate 28 and/or of additional treatment devices for the container 12 that is standing on the defective turntable 42, thus allowing an unlabeled container 14 to pass. The data bus control unit 46 (see FIGS. 2 and 3) of the turntable drives 44 can detect and track every container 14 that is standing on the defective turntable 42, so that these containers 14 are not labeled at the labeling aggregate 26.

During ongoing operation, the containers 12 and 14 are individually transferred at the discharge star 36 and the containers 12 are conveyed further in the conveying direction 20. Even though the unlabeled container 14 is transferred at the discharge star 36, it is subsequently ejected via a diverting device 40. This diverting device 40 can be installed at the discharge star 36 at a prescribed place or else at a conveying device located downstream from it.

Normally, the only containers 12 brought to this diverting device 40 are those that have a defect. In this context, containers 14 that are not labeled due to a defective turntable drive 44 can be ejected out of the conveying process by means of the diverting device 40. The diverted containers 14 are conveyed along an ejection path 22 and they are either collected at a collecting point (not shown here) or else fed back into the ongoing process, so that they can once again be introduced into the container stream upstream from the feed screw 30.

The decision as to whether an unlabeled container 14 is diverted can preferably be made on the basis of the position data provided by the data bus control unit 46 (see FIGS. 2 and 3) regarding the container 14 in question. As an alternative or in addition, an optical detection of the containers 12 can be carried out so that unlabeled containers 14 can be identified and then diverted. However, in this modality, no distinction is made between containers 12 which, due to a defective labeling aggregate 26 or to a defective brushing aggregate 28, have not been correctly labeled and those containers 14 for which the labeling aggregate 26 was intentionally deactivated for a short time due to a defective turntable drive 44. Those containers 12, 14 for which no distinction was made between the different reasons for the decision to eject them cannot be readily returned to the process, but instead, first have to be inspected.

Figure 2:
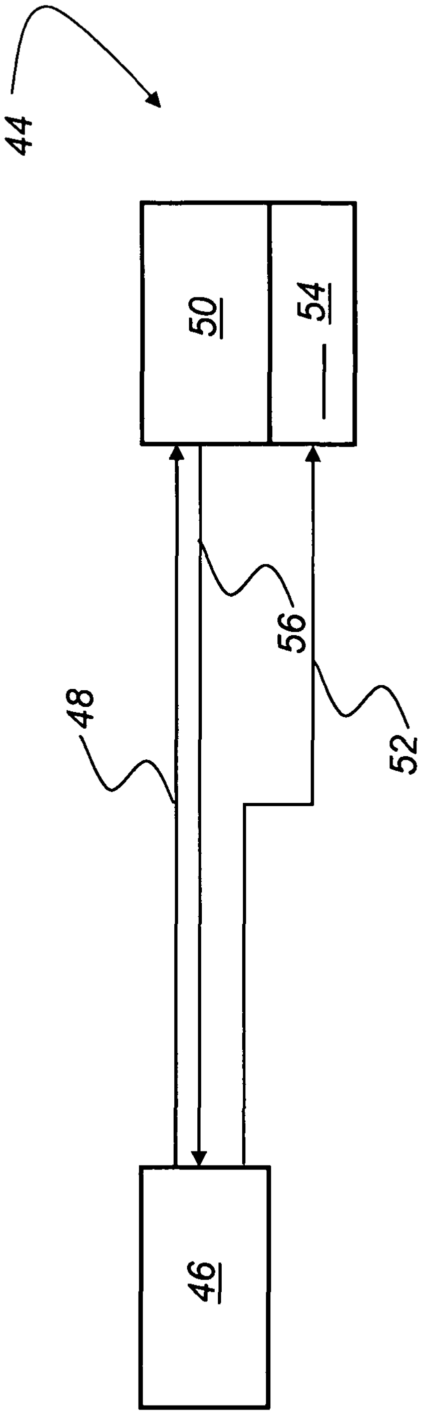
FIG. 2—shows, on the basis of a schematic block diagram, the actuation of electrically powered turntable drives of the rotary stage machine according to FIG. 1.
Figure 3:
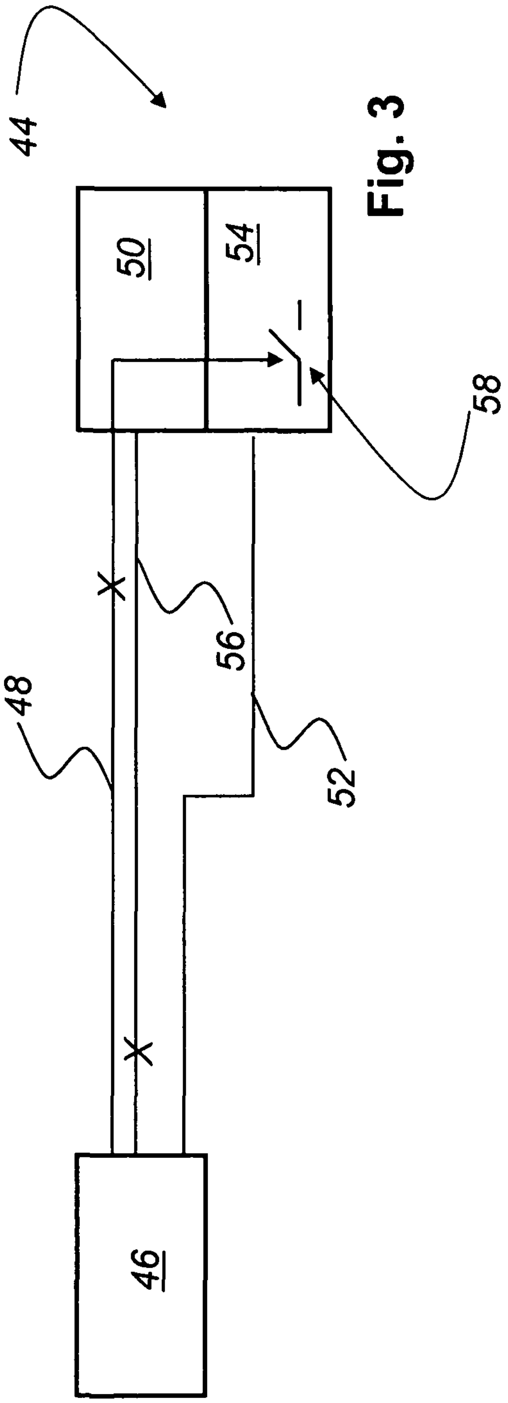
FIG. 3—shows, on the basis of another block diagram, the mode of operation with a deactivated turntable drive.

On the basis of schematic block diagrams, FIGS. 2 and 3 show the actuation of electrically powered turntable drives 44 of the rotary stage machine according to FIG. 1. Every single individual turntable drive 44 of the container stage 34 can be individually actuated by a shared data bus control unit 46 and can also be identified in every position. The data bus control unit 46 supplies control signals 48 for the servo drive 50 which can be, for example, an electric stepping motor, a servo motor, a servo synchronous motor or the like. It also delivers the power supply 52 to the end stages 54 of the turntable drive 44. The servo drive 50, in contrast, transmits error signals 56 to the data bus control unit 46, so that when errors are reported for a turntable drive 44, said data bus control unit 46 can at least interrupt its power supply 52 in the end stage 54 by means of an appropriate control signal 48. The interruption 58 in the end stage 54 is indicated by an open switch. As a result, the affected turntable drive 44 is shut down. The data bus control unit 46 delivers an appropriate control signal to the labeling aggregate 26, so that the container 14 standing on the switched-off turntable 42 is not labeled. Furthermore, the data bus control unit 46 delivers an appropriate control signal 48 to the diverting device 40, so that the unlabeled container 14 is diverted and, if applicable, conveyed back to the feed star 32.

The invention is not limited to the above-mentioned embodiments. Rather, numerous variants and modifications are conceivable which make use of the notion according to the invention and which therefore likewise fall within its protective scope.

What is claimed is:

1. A method for controlling a machine for treating containers as well as for controlling processing and/or treatment stations located downstream from the machine, the method comprising:

driving each of a plurality of turntables by an individual motor drive, the plurality of turntables orienting and positioning the containers, the machine being a rotary stage machine with the turntables arranged along a circumference of a rotor; and monitoring separately the motor drives of the turntables so that, if an error occurs with one or more of the turntable motor drives, the affected one or more defective turntable drive is deactivated while the machine and the stations located downstream continue to be operated;

wherein each deactivated turntable drive triggers a partial deactivation of the subsequent processing and/or treatment steps involving the container positions associated with the deactivated turntable drive of the machine, so that the machine and the stations located downstream continue to be operated at a reduced output due to the partial deactivation.

2. The method as recited in claim 1 wherein each deactivated turntable drive triggers an at least partial deactivation of the subsequent monitoring steps involving container positions associated with the deactivated turntable drive of the machine.

3. The method as recited in claim 2 wherein the partial deactivation of monitoring steps entails the deactivation of an automatic shutdown of the machine that would have resulted from the at least one defective turntable drive.

4. The method as recited in claim 1 wherein, when the defective turntable drive has been detected, a labeling device is temporarily deactivated at least for the container position associated with that defective turntable drive.

5. The method as recited in claim 1 wherein, when the defective turntable drive has been detected, a downstream filling device is temporarily deactivated, at least for the container position that is associated with the defective turntable drive.

6. The method as recited in claim 1 wherein, when the defective turntable drive has been detected, a downstream device for sealing the containers is temporarily deactivated, at least for the container position that is associated with the defective turntable drive.

7. The method as recited in claim 1 wherein each deactivated turntable drive is coupled to a diverting device downstream from the machine in order to divert the containers associated with the deactivated turntable drive from the subsequent processing and/or treatment steps of the machine.

8. The method as recited in claim 7 wherein the diverting device is coupled to a conveying device that returns the diverted containers to the machine and/or to a conveying device located upstream from the machine.

9. The method as recited in claim 1 wherein, when a turntable drive has been detected as being defective, a variable operating time remaining until a routine inspection and/or until a maintenance shutdown is shortened or reduced.

10. The method as recited in claim 1 wherein the method controls the rotary stage machine having a circular arrangement of a plurality of the turntables each driven by the motor drives and orienting and/or positioning the containers.

11. The method as recited in claim 1 wherein production by the machine continues to run without interruption.

12. The method as recited in claim 1 wherein the turntables rotate the containers.

13. The method as recited in claim 1 wherein the containers on the turntables pass a labeling station and are labeled.

14. The method as recited in claim 13 wherein the turntables rotate the containers relative to the labeling station.

15. The method as recited in claim 14 wherein the turntables drives are activated individually to rotate a respective container.

16. The method as recited in claim 13 further comprising at a brushing station pressing the labels against the containers while the containers are on the turntable.

17. The method as recited in claim 1 wherein the deactivated turntable drive is uncoupled from a data bus so that error messages from the deactivated turntable drive are ignored.

18. The method as recited in claim 17 wherein the deactivated turntable drive remains without current.

19. A rotary stage machine for processing and/or treating containers, comprising:

a plurality of turntables arranged along the circumference of a rotor, each turntable driven by an individual motor drive and orienting and/or positioning the containers, whereby each of the motor drives of the turntables is associated with a monitoring device that provides separate function monitoring and that emits an error signal when an error occurs; and a control device for processing the error signals, for deactivating affected defective turntable drives and for switching off individual functions of the machine while the machine continues to operate and stations located downstream continue to be operated; wherein each deactivated turntable drive triggers a partial deactivation of the subsequent processing and/or treatment steps involving the container positions associated with the deactivated turntable drive of the machine, so that the machine and the stations located downstream continue to be operated at a reduced output due to the partial deactivation.

* * * * *